(12) United States Patent
Hosokawa

(10) Patent No.: US 7,669,322 B2
(45) Date of Patent: Mar. 2, 2010

(54) PROCESS FOR MOUNTING PARTS TO CABLE

(75) Inventor: Toshiyuki Hosokawa, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 81 days.

(21) Appl. No.: 10/625,851

(22) Filed: Jul. 24, 2003

(65) Prior Publication Data

US 2004/0063359 A1  Apr. 1, 2004

(30) Foreign Application Priority Data

Jul. 25, 2002  (JP) ............................. 2002-216708

(51) Int. Cl.
*H01R 43/00* (2006.01)
(52) U.S. Cl. .......................... 29/857; 29/33 M; 29/854; 29/867; 174/112; 283/70
(58) Field of Classification Search ............... 29/33 M, 29/747, 748, 755, 854, 857, 861, 868, 829; 29/863; 101/35–36; 439/677; 81/9.51; 174/72 A, 174/112; 283/70
See application file for complete search history.

(56) References Cited

U.S. PATENT DOCUMENTS

| | | | | |
|---|---|---|---|---|
| 4,347,651 A | * | 9/1982 | Inoue et al. | 29/33 M |
| 4,534,313 A | * | 8/1985 | Louvel | 118/696 |
| 4,682,271 A | * | 7/1987 | Yamada | 29/829 |
| 4,852,248 A | * | 8/1989 | Anderson | 29/749 |
| 5,121,133 A | * | 6/1992 | Chiang | 101/35 |
| 5,153,839 A | * | 10/1992 | Cross | 29/755 |
| 5,353,699 A | * | 10/1994 | Tamura | 29/861 |
| 5,444,466 A | * | 8/1995 | Smyczek et al. | 101/35 |
| 5,470,253 A | * | 11/1995 | Siems et al. | 439/491 |
| 5,704,189 A | * | 1/1998 | Collier | 283/70 |
| 5,781,990 A | * | 7/1998 | Seidler et al. | 29/825 |
| 6,267,385 B1 | * | 7/2001 | Okamoto et al. | 174/77 R |

FOREIGN PATENT DOCUMENTS

| | | |
|---|---|---|
| JP | 51-115676 | 10/1976 |
| JP | 60-90720 | 6/1985 |
| JP | 61-58108 | 3/1986 |
| JP | 61-245412 | 10/1986 |
| JP | 62-176009 | 8/1987 |
| JP | 62-193504 | 8/1987 |
| JP | 63-182075 | 11/1988 |
| JP | 06-223639 | * 12/1994 |
| JP | 7-1645 | 1/1995 |
| JP | 08-203356 | 8/1996 |
| JP | 2001-256846 | 9/2001 |
| JP | 2002-109976 | 4/2002 |

* cited by examiner

*Primary Examiner*—Donghai D. Nguyen
(74) *Attorney, Agent, or Firm*—Arent Fox LLP

(57) ABSTRACT

In a process for mounting a plurality of parts to a cable in mounted positions and in mounted attitudes determined respectively for the parts, information for the mounting of each of parts is marked on the cable before mounting of the parts. Thus, the mounting of the parts can be carried out without selection of a worker, leading to an improved general-purpose property. Also, an exclusive jig is not required, resulting in a reduced cost and elimination of need to secure a space for storing the jig.

9 Claims, 5 Drawing Sheets

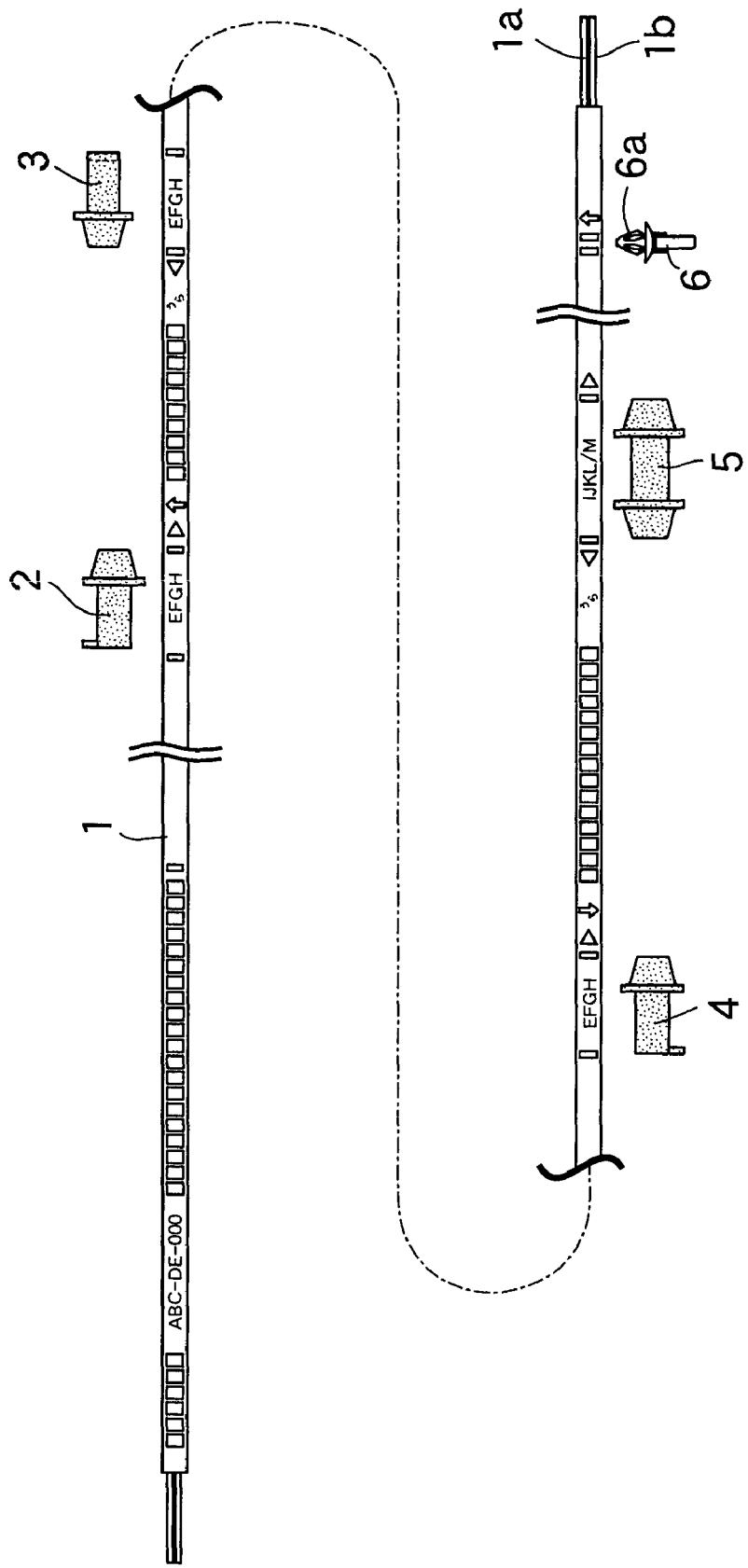

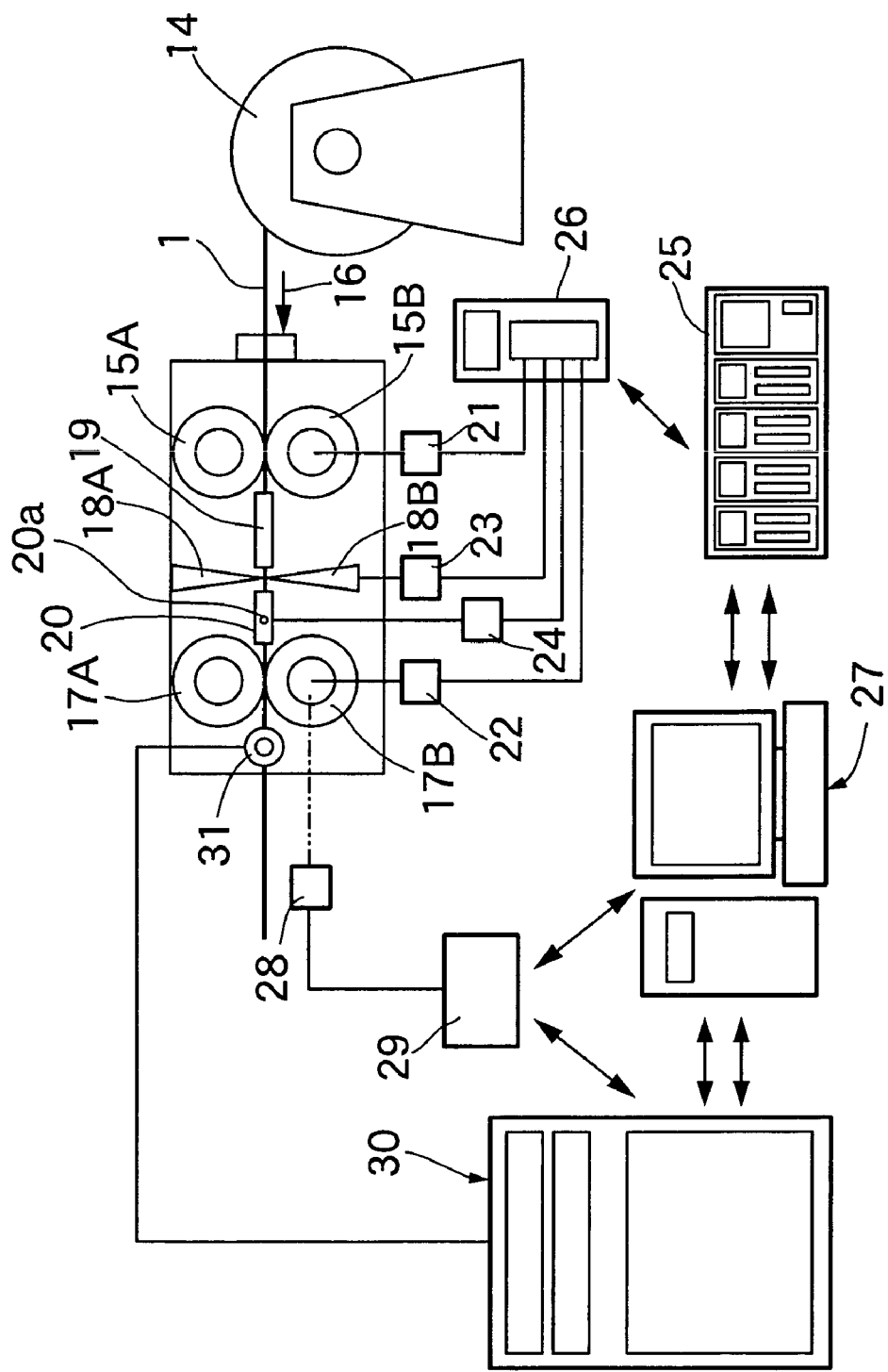

PROCESS FOR MOUNTING PARTS TO CABLE

BACKGROUND OF THE INVENTION

1. Field of the Invention

The present invention relates to a process for mounting a plurality of parts to a cable in mounted positions and in mounted attitude determined respectively for the parts.

2. Description of the Related Art

A plurality of parts such as a harness band and a grommet are mounted to a cable disposed, for example, in a vehicle, in mounted positions and in mounted attitudes determined respectively for the parts. Conventionally, to mount a plurality of the parts to a cable, a worker mounts each of the parts to a cable having a length determined depending on the type of vehicle, using a mounting jig exclusively used for the vehicle, and confirms whether each part is mounted as specified by comparing the mounted state with a visual checker in which each part has been mounted previously to the cable as specified.

In many cases, such mounting of the parts to the cable is carried out by an unskilled worker such as a part-time worker. In the above-described conventional mounting process, the movement of the exclusive mounting jig is required, and hence a worker must be selected for each type of vehicle, resulting in a deteriorated general-purpose property. In addition, a mounting jig and a visual checker are required for each type of vehicle, resulting in an increase in equipment investment cost and an increase in space for storing the jig.

The present invention has been accomplished with such circumstance in view, and it is an object of the present invention to provide a process for mounting parts to a cable, wherein the mounting of the parts can be conducted without selection of a worker to improve general-purpose property, and an exclusive jig is not required resulting in a reduction in cost and elimination of need to secure a space for storing the jig.

SUMMARY OF THE INVENTION

To achieve the above object, according to a first feature of the present invention, there is provided a process for mounting a plurality of parts to a cable in mounted positions and in mounted attitudes determined respectively for the parts, wherein information for the mounting of each of the parts is marked on the cable before the mounting of the parts.

With the process according to the first feature of the present invention, the information for the mounting of each of the plurality of parts is marked on the cable before the mounting of the parts. Therefore, a worker merely mounts each of the parts to the cable according to the marking, and thus the mounting of the parts can be conducted without selection of a worker, leading to an improved general-purpose property. Moreover, an exclusive jig is not required, resulting in a reduction in cost and elimination of need to secure a space for storing the jig.

According to a second feature of the present invention, in addition to the first feature, the information includes the name, the mounted position and the mounted attitude of each of the parts. With such feature, each of the parts can be mounted to the cable as specified without a jig for adjusting the mounted position, the mounted attitude and the like of each part, and leading to an improved workability.

According to a third feature of the present invention, in addition to the first and second features, the marking is carried out at a step of cutting the cable into a predetermined length.

With such feature, a step of carrying out the marking is not required to be conducted as a separate step, leading to an improved productivity.

BRIEF DESCRIPTION OF DRAWINGS

FIG. 2 is a side view of the cable before mounting of the parts.

FIG. 3 is a diagram showing the arrangement of a cable-cutting/imprinting unit.

DESCRIPTION OF THE PREFERRED EMBODIMENT

The present invention will now be described by way of an embodiment with reference to the accompanying drawings.

Figure 1:
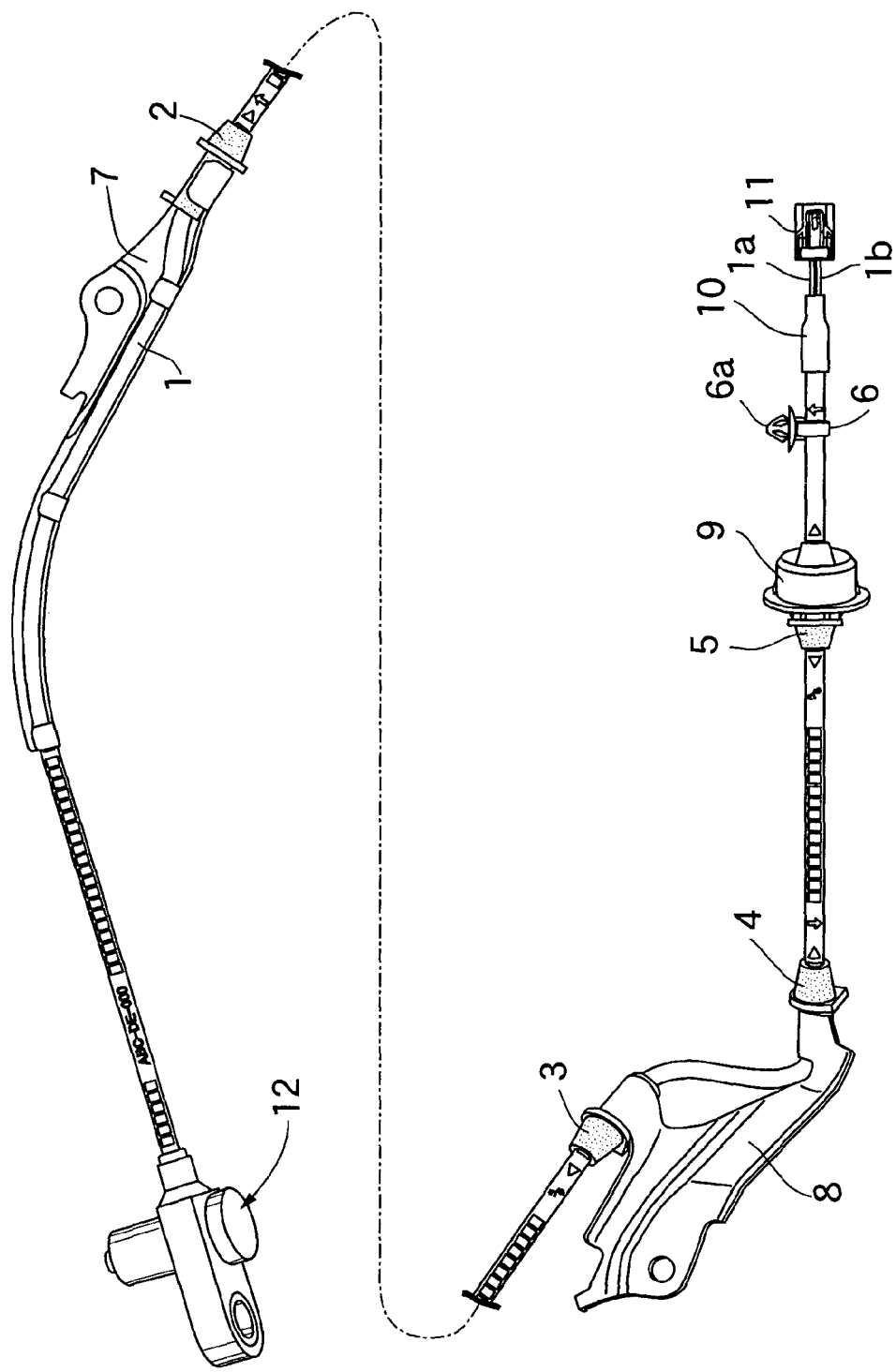
FIG. 1 is a side view of a cable in a state in which parts have been mounted.

Referring first to FIG. 1, a cable 1 is used, for example, as a sensor harness for an antilock brake device of a vehicle. A first rubber 2 which is a first part, a second rubber 3 which is a second part, a third rubber 4 which is a third part, a fourth rubber 5 which is a fourth part, and a harness band 6 which is a fifth part, are mounted by a worker to the cable 1 cut into a length determined depending on each type of vehicle.

The first rubber 2 is mounted to the cable 1 in order to mount one end of a first mounting metal piece 7 for supporting the cable 1 on a vehicle body. The second and third rubbers 3 and 4 are mounted to the cable 1 in order to mount opposite ends of a second mounting metal piece 8 for supporting the cable 1 on the vehicle body. The fourth rubber 5 is mounted to the cable 1 in order to mount a grommet 9 for fixing the cable 1 by insertion of the cable 1 therethrough. The harness band 6 is mounted to the cable 1 to have a grip 6 for supporting the cable 1 on a wall surface of the vehicle body.

The first to fourth rubbers 2 to 5 and the harness band 6 are mounted to the cable 1 in mounted positions and in amounted attitudes determined respectively for them. Information for the mounting of each of the first to fourth rubbers 2 to 5 and the harness band 6 is marked on the cable 1 before mounting of these parts 2 to 6. The information referred to herein includes the name, the mounted position, the mounted attitude and the like of each part.

More specifically, the mounted position of each of the first to fourth rubbers 2 to 5 and the harness band 6 is indicated as a space between two "|", and the name of each of the first to fourth rubbers 2 to 5 are represented in a combination of the alphabet "A" to "Z" between the two "|". Particularly, the mounted position and the name of the harness band 6 are indicated by a small space between two "|". The mounted attitude of each of the first to fourth rubbers 2 to 5 and the harness band 6 is indicated outside one of the two "|" by any of characters 1 to 4 shown in Table 1 below, "REVERSE" and the like.

TABLE 1

| Character 1 | Character 2 | Character 3 | Character 4 |
| --- | --- | --- | --- |
| ⇧ | ⇩ | ◁ | ▷ |

Further, an indication showing the product name of the part is shown by a combination of the alphabets "A" to "Z" and numerals "0" to "9" on a surface of the cable 1 at a location out of the mounted positions of the first to fourth rubbers 2 to 5 and the harness band 6.

The first to fourth rubbers 2 to 5 are slid to the mounted positions determined by the above-described marking in a state in which the cable 1 has been inserted through them. The first to fourth rubbers 2 to 5, whose mounted attitudes relative to the cable 1 have been determined so that the attitudes of the first mounting metal piece 7, the second mounting metal piece 8 and the grommet 9 relative to the cable 1 are predetermined attitudes, are fixed to the cable 1 in their mounted positions by an adhesive. The harness band 6 is mounted directly to the cable 1, and the harness band 6, whose mounted attitude relative to the cable 1 has been determined, so that it is a predetermined attitude, is also fixed to the cable 1 in its mounted position by an adhesive.

After the first to fourth rubbers 2 to 5 and the harness band 6 have been mounted to the cable 1 in the mounted positions and in the mounted attitudes determined respectively for them, a terminal cap 10 is mounted to one end of the cable 1; a coupler 11 is connected to lead wires 1a and 1b drawn from the terminal cap 10; and a wheel speed sensor 12 is connected by mold-coupling to the other end of the cable 1. Thereafter, the first mounting metal piece 7 is mounted to the first rubber 2; the second mounting metal piece 8 is mounted to the second and third rubbers 3 and 4; and the grommet 9 formed in a split configuration for holding the fourth rubber from opposite sides is mounted to the fourth rubber 5. Moreover, the cable 1 is held at a plurality of points thereon by the first mounting metal piece 7; bent in correspondence to the first mounting metal piece 7 in a region corresponding to the first mounting metal piece 7; and also bent in correspondence to the second mounting metal piece 8 in a region between the second and third rubbers 3 and 4.

In a state in which the first to fourth rubbers 2 to 5, the harness band 6, the first and second mounting metal pieces 7 and 8, the grommet 9, the terminal cap 10 and the coupler 11 have been mounted to the cable 1, it is finally confirmed whether the parts 7 to 11 have been mounted as specified by visually checking the entire cable 1 while comparing them with markings.

The cable 1 is cut into a predetermined length by the cable-cutting/imprinting unit shown in FIG. 3. The cable-cutting/imprinting unit includes: a reel 14 around which the cable 1 is wound and stored; upstream feed rollers 15A and 15B vertically forming a pair to draw the cable 1 from the reel 14; downstream feed rollers 17A and 17B disposed downstream from the upstream feed rollers 15A and 15B in a direction 16 of movement of the cable 1 and vertically forming a pair; cutting blades 18A and 18B disposed centrally between the upstream feed rollers 15A and 15B and the downstream feed rollers 17A and 17B and vertically forming a pair; an upstream guide tube 19 disposed between the upstream feed rollers 15A and 15B and the cutting blades 18A and 18B; a downstream guide tube 20 disposed between the cutting blades 18A and 18B and the downstream feed rollers 17A and 17B; and an imprinting device 30. The downstream guide tube 20 is rotatable about an axis of a support shaft 20a mounted at an axially central portion thereof.

The upstream and downstream feed rollers 15A and 15B; 17A and 17B vertically forming the pairs, respectively, are driven by driving means 21 and 22 such as a servo motor or a stepping motor which can counterrotate. The cutting blades 18A and 18B vertically forming the pair are driven by a driving means 23 for movement among a non-cutting position where the cable 1 is not cut, a coat-cutting position where only a coat is cut to peel the coat from the cable 1, and a cutting position where the entire cable 1 is completely cut. The downstream guide tube 20 is driven by a driving means 24 in such a manner that its horizontal attitude and its vertical attitude are switched over from one to another.

The operations of the driving means 21 to 24 are controlled by control signals output from a controller 26 based on commands from a sequence control unit 25 so that the driving means are operated according to a predetermined program. Moreover, a personal computer 27 is connected to the sequence control unit 25 in order to administer the setting of conditions corresponding to types of a plurality of vehicles. To detect a feed length of the cable 1, an encoder 28 is coupled to, for example, one 17B of the downstream feed rollers 17A and 17B, and a signal from the encoder 28 is input to the personal computer 27 through a signal dispenser 29.

Moreover, a imprinting head 31 of the imprinting device 30 is disposed downstream from the downstream feed rollers 17A and 17B in the direction 16 of movement of the cable 1 so that it can provide the markings on the surface of the cable 1. The personal computer 27 is connected to the imprinting device 30, and the signal from the encoder 28 is also input to the imprinting device 30 through the signal dispenser 29.

The imprinting device 30 is adapted to mark, onto the cable 1, information for the mounting of each of the first to fourth rubbers 2 to 5 and the harness band 6, and the marks are provided on the cable 1 at a step of cutting the cable 1 into the predetermined length.

Figure 4A:
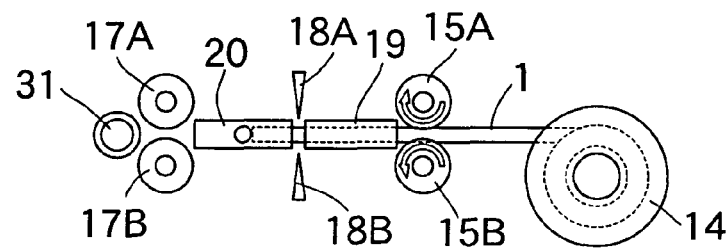
FIGS. 4A to 4J are views sequentially showing a step of cutting the cable.
Figure 4B:
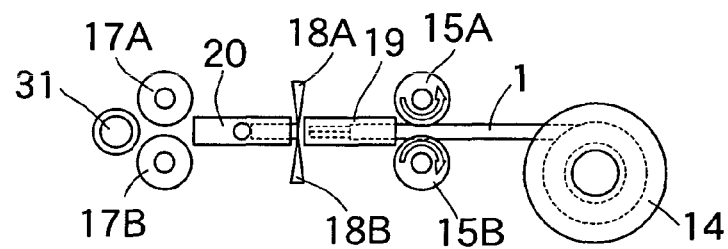
Figure 4C:
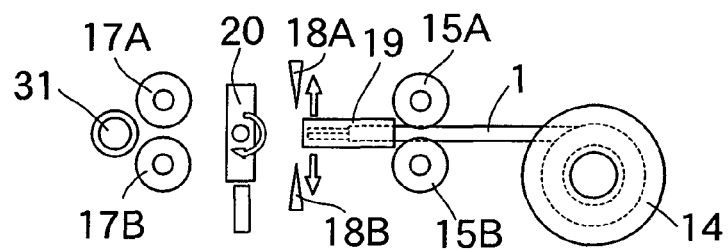

Steps of cutting the cable 1 and marking the information on the cable 1 by the cable-cutting/imprinting unit will be described with reference to FIGS. 4A to 4J. The cable 1 is drawn from the reel 14 by the rotation of the upstream feed rollers 15A and 15B, as shown in FIG. 4A. In a state in which a leading end of the cable 1 has entered into the downstream guide tube 20 by a predetermined length, the pair of upper and lower cutting blades 18A and 18B are operated from the non-cutting position to the coat-cutting position, and thereafter the cable 1 is returned so that its leading end recedes into the upstream guide roller 19 by the reverse rotation of the upstream feed rollers 15A and 15B, as shown in FIG. 4B. Thus, the coat portion at the leading end of the cable 1 is peeled off, and the removed coat portion is left in the downstream guide tube 20. Thereupon, when the cutting blades 18A and 18B are operated to the non-cutting position and the downstream guide tube 20 is turned to assume a vertical attitude, as shown in FIG. 4C, the removed coat portion left in the downstream guide tube 20 is discharged.

Figure 4D:
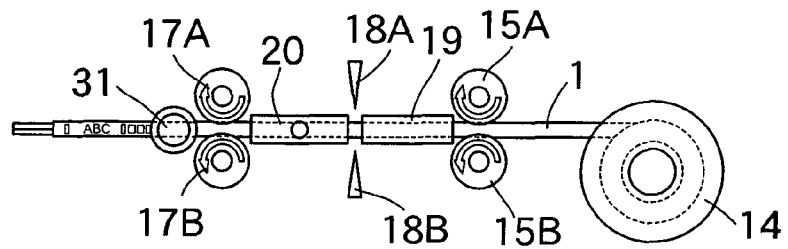

Thereafter, the downstream guide tube 20 is returned to the horizontal attitude, and the upstream and downstream feed rollers 15A and 15B; 17A and 17B are rotated forward, whereby the cable 1 is fed to the imprinting head 31, as shown in FIG. 4D. When the mounted position of each of the first to fourth rubbers 2 to 5 and the harness band 6 on the cable 1 reaches a position corresponding to the imprinting head 31, the information for the mounting of each of the first to fourth rubbers 2 to 5 and the harness band 6, i.e., the name, the mounted position and the mounted attitude of each of the first to fourth rubbers 2 to 5 and the harness band 6 are marked on the cable 1 by the imprinting head 31.

Figure 4E:
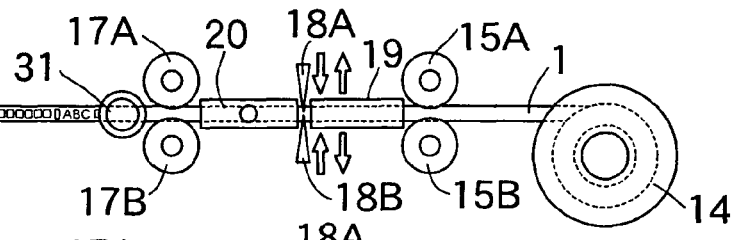
Figure 4F:
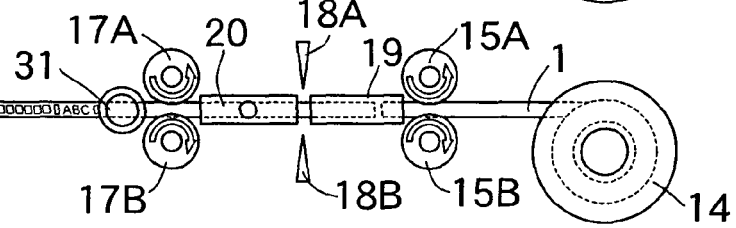
Figure 4G:
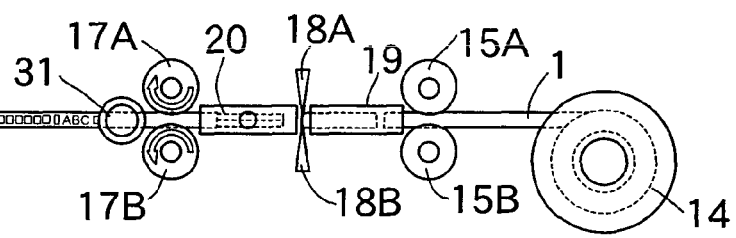
Figure 4H:
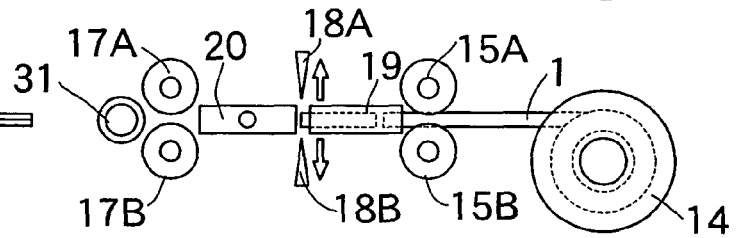

When the cable 1 has been fed by the predetermined length, the cable 1 is cut into the predetermined length by operating the cutting blades 18A and 18B from the non-cutting position to the cutting position, as shown in FIG. 4E. Thereafter, the cable 1 is returned by a length for peeling off the coat at a trailing end of the cable 1 by reversing the upstream feed rollers 15A and 15B, as shown in FIG. 4F. Further, the cutting blades 18A and 18B are operated to the coat-cutting position, and the downstream feed rollers 17A and 17B are rotated forward, as shown in FIG. 4G. Thus, the cable 1 of the predetermined length 19 is removed from the cable-cutting/imprinting unit in a state in which the required marking has been finished, and the removed coat portion is left in the upstream guide tube 19, as shown in FIG. 4H.

Figure 4I:
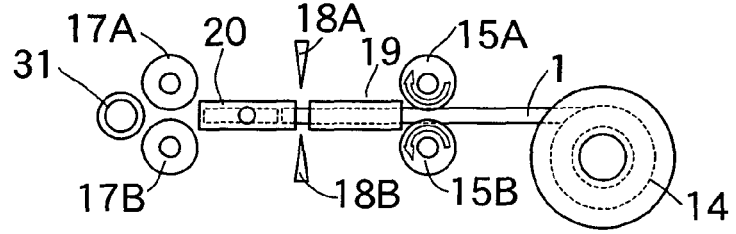
Figure 4J:
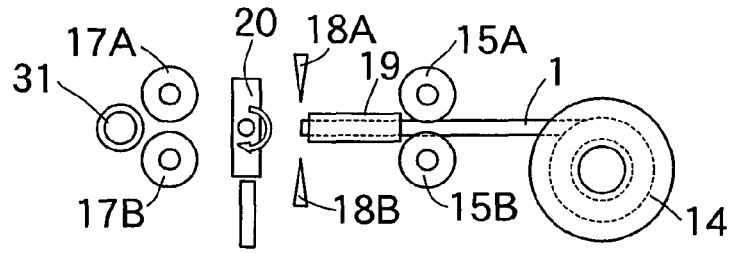

The removed coat portion left in the upstream guide tube 19 is pushed out to the downstream guide tube 20 by rotating forward the upstream feed rollers 15A and 15B, as shown in FIG. 4I. Therefore, when the downstream guide tube 20 is turned to assume the vertical attitude, as shown in FIG. 4J after the leading end of the succeeding cable 1 is returned into the upstream guide tube 19 by reversing the upstream feed rollers 15A and 15B, the removed coat portion left in the downstream guide tube 20 is discharged.

Thereafter, the subsequent cutting and imprinting process of the cable 1 is started from the state shown in FIG. 4A in which the downstream guide tube 20 has been returned to the horizontal attitude.

The operation of the present embodiment will be described below. To mount the first to fourth rubbers 2 to 5 and the harness band 6 to the cable 1, the information for the mounting of each of the first to fourth rubbers 2 to 5 and the harness band 6 is marked previously on the cable 1 before the mounting. Therefore, the worker merely mounts the first to fourth rubbers 2 to 5 and the harness band 6 according to the markings. Thus, the mounting of the parts can be conducted without selection of a worker, leading to an improved general-purpose property. Moreover, an exclusive jig is not required, resulting in a reduction in cost and elimination of need to secure a space for storing the jig.

In addition, since the name, the mounted position and the mounted attitude of each of the first to fourth rubbers 2 to 5 and the harness band 6 are marked as the information for the mounting of each of the first to fourth rubbers 2 to 5 and the harness band 6, a jig for adjusting the mounted position and the mounted attitude of each of the first to fourth rubbers 2 to 5 and the harness band 6 is not required, and the first to fourth rubbers 2 to 5 and the harness band 6 can be easily mounted to the cable 1 as specified, leading to an improved workability.

Further, since the cable 1 is subjected to the marking at the step of cutting the cable 1 to the predetermined length, a step of conducting the marking need not be carried out as a separate step, leading to an improved productivity.

Although the embodiment of the present invention has been described, it will be understood that various modifications in design may be made without departing from the scope of the present invention described in the claims.

What is claimed is:

1. A process for mounting a plurality of parts to a marked cable comprising:
   feeding a cable into a cable-cutting and imprinting machine;
   detecting a length of the cable fed into the cable-cutting and imprinting machine;
   marking the cable with a first information for mounting a first part of the plurality of parts on the marked cable, without cutting and stripping the cable, when detecting that a first predetermined positional length for mounting the first part has been reached;
   continuing feeding the cable with the first marked information to the cable-cutting and imprinting machine and marking the cable with a second information and a third information for mounting a second part and a third part of the plurality of parts on the marked cable, without cutting and stripping the cable, when detecting that a second predetermined positional length for mounting the second part has been reached and a third predetermined positional length for mounting the third part has been reached, wherein the first information, the second information and the third information including first, second and third mounted positions of the first, second and third parts on the marked cable, respectively, the first, second and third mounted positions are intermediate between opposite longitudinal ends of the marked cable;
   cutting the cable, by the cable-cutting and imprinting machine, to generate the marked cable when detecting that the cable fed into the cable-cutting and imprinting machine reaches a final predetermined length; and
   thereafter mounting the first, the second and the third parts on the first, the second and the third mounted positions marked on the marked cable according the first, the second and the third mounting information, respectively.

2. A process for mounting parts to a marked cable according to claim 1, wherein the step of marking the cable with information for mounting each of the parts further comprises marking the cable with a name and a mounted attitude of each of the parts.

3. A process for mounting a plurality of parts to a marked cable according to claim 1, wherein the step of mounting comprises sliding at least one of the plurality of parts onto the marked cable.

4. A process for mounting a plurality of parts to a marked cable according to claim 1, wherein the plurality of parts are fixed to the marked cable at mounted positions by an adhesive.

5. A process for mounting a plurality of parts to a marked cable according to claim 1, wherein the marked cable is a sensor harness for a device mounted on a vehicle.

6. A process for mounting a plurality of parts to a marked cable according to claim 5, wherein the device is an antilock brake.

7. The process for mounting parts to a cable according to claim 1, further comprising:
   coat-cutting a starting end of the cable after the cable is fed into the cable-cutting and imprinting machine; and
   coat-cutting an ending end of the cable after the cable is cut into the final predetermined length.

8. A process for mounting a plurality of parts to a cable that is to be fixed to a structure at a plurality of portions thereof via at least some of said plurality of parts, the process comprising:
   feeding the cable into a cable-cutting and imprinting machine;
   detecting a length of the cable fed into the cable-cutting and imprinting machine;
   marking the cable with a first information for mounting a first part of the plurality of parts on the marked cable, without cutting and stripping the cable, when detecting that a first predetermined positional length for mounting the first part has been reached;
   continuing feeding the cable with the first marked information to the cable-cutting and imprinting machine and marking the cable with a second information and a third information for mounting a second part and a third part of the plurality of parts on the marked cable, without cutting and stripping the cable, when a second predetermined positional length for mounting the second part has been reached and a third predetermined positional length for mounting the third part has been reached, wherein the first information, the second information and the third information including first, second and third mounted positions of the first, second and third parts on the marked cable, respectively, the first, second and third mounted positions of the first, second and third parts are intermediate between opposite longitudinal ends of the marked cable;

cutting the cable to generate the marked cable when the cable fed into the cable cutting and mounting machine reaches a final predetermined length; and thereafter mounting the first second and third parts on the first, second and third mounted locations marked on the marked cable according the first, second and third mounting information, respectively, before the marked cable is fixed to said structure at said plurality of portions by using said at least some of the plurality of parts.

9. A process for preparing a cable and fixing the cable to a structure at a plurality of portions thereof by means of a plurality of parts mounted to the cable, the process comprising:

feeding a cable into a cable-cutting and imprinting machine;

detecting a length of the cable fed into the cable-cutting and imprinting machine;

marking the cable with a first information for mounting a first part of the plurality of parts on the cable, without cutting and stripping the cable, when detecting that a first predetermined positional length for mounting the first part on the cable has been reached;

continuing feeding the cable with the first marked information to the cable-cutting and imprinting machine and marking the cable with a second information and a third information for mounting a second part and a third part of the plurality of parts on the cable, without cutting and stripping the cable, when detecting that a second predetermined positional length for mounting the second part has been reach and a third predetermined positional length for mounting the third part has been reached, wherein the first information, the second information and the third information including first, second and third mounted positions of the first, second and third parts on the marked cable, respectively, the first, second and third mounted positions of the first, second and third parts are intermediate between opposite longitudinal ends of the marked cable;

cutting the cable to generate the marked cable when the cable fed into the cable cutting and mounting machine reaches a final predetermined length;

then mounting the first second and third parts on the first, second and third mounted locations marked on the marked cable according the first, second and third mounting information, respectively; and thereafter fixing the marked cable to said structure at said plurality of portions by using said plurality of parts.

* * * * *